(12) United States Patent
Zhang et al.

(10) Patent No.: US 9,309,115 B2
(45) Date of Patent: Apr. 12, 2016

(54) METHOD OF PURIFICATION OF BIOMASS SYNGAS UNDER POSITIVE PRESSURE

(71) Applicant: WUHAN KAIDI GENERAL RESEARCH INSTITUTE OF ENGINEERING & TECHNOLOGY CO., LTD., Wuhan (CN)

(72) Inventors: Yanfeng Zhang, Wuhan (CN); Hongtao Nie, Wuhan (CN); Minggui Xia, Wuhan (CN); Wenyan Liu, Wuhan (CN); Liang Zhang, Wuhan (CN)

(73) Assignee: Wuhan Kaidi General Research Institute of Engineering & Technology Co., Ltd., Wuhan (CN)

( * ) Notice: Subject to any disclaimer, the term of this patent is extended or adjusted under 35 U.S.C. 154(b) by 0 days.

(21) Appl. No.: 14/314,000

(22) Filed: Jun. 24, 2014

(65) Prior Publication Data

US 2015/0041719 A1    Feb. 12, 2015

Related U.S. Application Data

(63) Continuation-in-part of application No. PCT/CN2012/083534, filed on Oct. 26, 2012.

(30) Foreign Application Priority Data

Dec. 29, 2011    (CN) .......................... 2011 1 0449549

(51) Int. Cl.
*C01B 3/38*  (2006.01)
*C01B 3/02*  (2006.01)
*C10K 1/02*  (2006.01)
*C10K 1/06*  (2006.01)
*C10K 1/04*  (2006.01)

(52) U.S. Cl.
CPC ... *C01B 3/02* (2013.01); *C10K 1/02* (2013.01); *C10K 1/046* (2013.01); *C10K 1/06* (2013.01); *C10G 2300/1011* (2013.01); *Y02P 20/129* (2015.11); *Y02P 30/20* (2015.11)

(58) Field of Classification Search
CPC ........................................................ C01B 3/02
USPC ........................................................ 252/373
See application file for complete search history.

(56) References Cited

U.S. PATENT DOCUMENTS

| 2007/0051044 A1* | 3/2007 | Holle et al. ..................... 48/210 |
| 2009/0277089 A1* | 11/2009 | Neathery .......................... 48/76 |
| 2010/0119428 A1* | 5/2010 | Nagayasu et al. ....... 423/243.08 |
| 2011/0283703 A1* | 11/2011 | Gu et al. ......................... 60/670 |

FOREIGN PATENT DOCUMENTS

| CN | 2680761 | * | 2/2005 |
| JP | 11-21565 | * | 1/1999 |

* cited by examiner

*Primary Examiner* — Melvin C Mayes
*Assistant Examiner* — Kenneth Vaden
(74) *Attorney, Agent, or Firm* — Matthias Scholl P.C.; Matthias Scholl

(57) ABSTRACT

A method for purifying biomass syngas under a positive pressure. The method includes: 1) aerating a pyrolysis gasifier by using an oxidation fan; 2) introducing syngas produced in the pyrolysis gasifier through a water-cooling flue to a water-cooling quench tower; 3) introducing the syngas from the water-cooling quench tower to a waste heat boiler of a water-tube type and a waste heat boiler of a heat-tube type; 4) introducing the syngas from the waste heat boiler of the heat-tube type to a Venturi scrubber in the absence of a filler to wash the syngas and remove dust; 5) introducing the syngas from the Venturi scrubber to a wet electrical dust precipitator for further removing the dust; and 6) transporting qualified syngas to a wet gas tank for storage or to a downstream process for use.

7 Claims, 1 Drawing Sheet

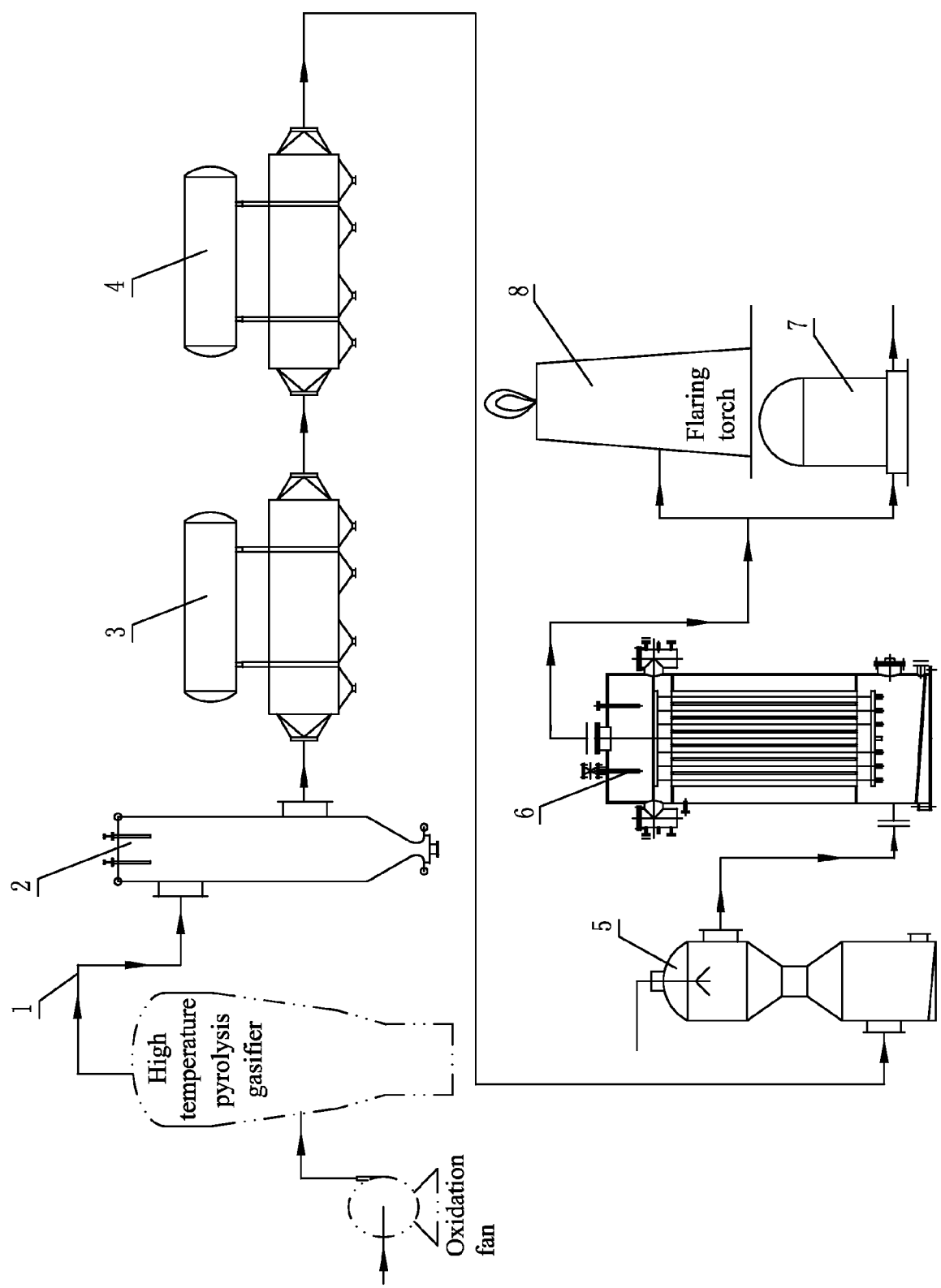

METHOD OF PURIFICATION OF BIOMASS SYNGAS UNDER POSITIVE PRESSURE

CROSS-REFERENCE TO RELATED APPLICATIONS

This application is a continuation-in-part of International Patent Application No. PCT/CN2012/083534 with an international filing date of Oct. 26, 2012, designating the United States, now pending, and further claims priority benefits to Chinese Patent Application No. 201110449549.5 filed Dec. 29, 2011. The contents of all of the aforementioned applications, including any intervening amendments thereto, are incorporated herein by reference. Inquiries from the public to applicants or assignees concerning this document or the related applications should be directed to: Matthias Scholl P. C., Attn.: Dr. Matthias Scholl Esq., 245 First Street, 18$^{th}$ Floor, Cambridge, Mass. 02142.

BACKGROUND OF THE INVENTION

1. Field of the Invention

The invention relates to a method for purifying biomass syngas under a positive pressure.

2. Description of the Related Art

Like coal gas production, the biomass gas production requires purification processes of cooling and washing. The temperature of the crude coal gas from a carbonization furnace is at 650° C. while the temperature of the syngas at the outlet of the gasifier is higher than 1000° C. Thus, it is desired to develop an innovative cooling method for biomass syngas.

Conventional means for preliminary cooling the coal gas include: indirect preliminary cooling, direct preliminary cooling, and indirect-direct preliminary cooling. The preliminary cooling mainly means that the coal gas is cooled to a temperature of between 22 and 35° C. after flowing out of the carbonization furnace and before entering an electric tar precipitator.

Methods for removing dust from coal gas include: precipitation, filter, cyclone, electric precipitation, water washing, and dust removal by Venturi scrubber. Different dust removal methods vary in the dust removal effect and the resistance consumption.

Characterized in complicate system, long procedure, high energy consumption, low efficiency and stability, and being uneconomic, the conventional methods for coal gas purification must be optimized and developed when it is applied to treat the biomass syngas.

SUMMARY OF THE INVENTION

It is one objective of the invention to provide a method for purifying biomass syngas under a positive pressure for producing oil. By adopting optimized and targeted process scheme and procedure design, by reasonably configuring process devices, and by properly controlling process parameters, problems are solved that the conventional coal chemical industrial purification method has complicate system, long procedure, high energy consumption, low efficiency and stability, and is uneconomic and poorly targeted, so that the technology and the economy are unified.

Technical solution of the invention is developed based on characteristics of the high-temperature plasma gasification process in the biomass fixed bed and the syngas (having a temperature of between 1000 and 1100° C., a dust content of below 20 g/Nm$^3$, and a tar content of below 3 g/Nm$^3$) and according to the cooling and purification process of coal gas.

A method for purifying biomass syngas under a positive pressure for producing oil, the method comprises: aerating a high-temperature pyrolysis gasifier by using an oxidation fan; introducing high-temperature syngas produced in the high-temperature pyrolysis gasifier through a high-temperature water-cooling flue to a water-cooling quench tower, where water is sprayed into the high-temperature syngas for quenching a part of slag; introducing the syngas from the water-cooling quench tower to a waste heat boiler of a water-tube type and a waste heat boiler of a heat-tube type, where waste heat is recovered in two sections at two pressures, by-products including middle pressure vapor and low pressure vapor are produced and supplied to external devices, and a heavy tar is condensed and recovered by the waste heat boiler of the heat-tube type; introducing the syngas from the waste heat boiler of the heat-tube type to a Venturi scrubber in the absence of a filler to wash the syngas and remove dust; introducing the syngas from the Venturi scrubber to a wet electrical dust precipitator for further removing the dust and a tar so that both a dust content and a tar content in the syngas are <10 mg/Nm$^3$, a temperature of the syngas is <45° C., and a sensible heat recovery is higher than 80%; and transporting qualified syngas to a wet gas tank for storage or to a downstream process for use.

In a class of this embodiment, the high-temperature syngas produced in the high-temperature pyrolysis gasifier has the temperature of between 1000 and 1100° C., the dust content of lower than 20 g/Nm$^3$, and the tar content of lower than 3 g/Nm$^3$. The high-temperature syngas is introduced out of the gasifier via a top thereof, through the high-temperature water-cooling flue, and into the water-cooling quench tower, where water is sprayed to decrease a temperature of the syngas to be 800±20° C. and to condense the slag. The syngas is then introduced to the waste heat boiler of the water-tube type for recovering middle temperature waste heat; and the middle pressure vapor produced therein is supplied to the external devices. The syngas flowing out of the waste heat boiler of the water-tube type has a temperature of 450±20° C. The syngas is then transported to the waste heat boiler of the heat-tube type for recovering low temperature waste heat; and the low pressure vapor produced therein is supplied to the external devices. The syngas is cooled in the waste heat boiler of the heat-tube type, and the heavy tar is separated simultaneously and is collected by a chute. The temperature of the syngas flowing out of the waste heat boiler of the heat-tube type is decreased to 200±10° C. The syngas is then transported to the Venturi scrubber in the absence of the filler to wash the syngas, remove the dust, and further decrease the temperature of the syngas, so that a majority of the dust, tar drops, and water soluble gas enter a washing liquid and are removed. The temperature of the syngas after washing is 45±2° C. The syngas is transported to the wet electrical dust precipitator to further remove the dust and the tar therein so that the syngas has both the dust content and the tar content of <10 mg/Nm$^3$, the temperature of <45° C., and the sensible heat recovery of higher than 80%. The qualified syngas is transported to the wet gas tank for storage or is supplied to the downstream process for use. A flare is in parallel connection with the wet gas tank for combusting waste gas.

In a class of this embodiment, the oxidation fan is employed to blast air and provide the positive pressure, thereby deleting a coal gas blower. By increasing an outlet pressure of the oxidation fan, an outlet pressure of the high-temperature pyrolysis gasifier overcomes a resistance of a washing system and an inlet pressure of the wet gas tank still maintains at between 4 and 6 kPa, whereby enabling the water-cooling quench tower, the waste heat boiler of the water-tube type, the waste heat boiler of the heat-tube type, the Venturi scrubber in the absence of the filler, the wet electrical dust precipitator, and the wet gas tank to work at the positive pressure, preventing the atmosphere from penetrating into the above devices, and decreasing the possibility of gas explosion.

In a class of this embodiment, both the high-temperature water-cooling flue and the water-cooling quench tower adopt membrane water-cooling pipe structures, thereby decreasing the weight thereof, avoiding a problem of abscission of fireproof materials, and improving the operation reliability. The high-temperature water-cooling flue, the water-cooling quench tower, and the waste heat boiler are in series connection to form a water circulating system, so that the water cooling problem of the circulating water is solved, and a full recovery of the heat energy is realized.

In a class of this embodiment, water is sprayed into the high-temperature syngas in the water-cooling quench tower for decreasing the temperature of the syngas to 800±20° C. and condensing the slag in the syngas; and the slag is discharged from a tower bottom. Thus, heating surfaces of the waste heat boilers are prevented from slag pollution, and stability of heat exchange performance of the waste heat boilers is ensured.

In a class of this embodiment, the waste heat boiler includes a high temperature section and a lower temperature section. The high temperature section employs the waste heat boiler of the water-tube type, and the lower temperature section employs the waste heat boiler of the heat-tube type. The temperature of the syngas at the outlet of the waste heat boiler of the water-tube type is 450±20° C., which is higher than a condensation point of the heavy tar, thereby avoiding the condensation of the tar. A design pressure in the waste heat boiler of the water-tube type is equal to or larger than 1.6 megapascal, thereby improving the temperature quality of the vapor and satisfying requirements of corresponding chemical vapor.

A temperature of the syngas at the outlet of the waste heat boiler of the heat-tube type is controlled at less than 200° C. to condense the heavy tar in this section and to collect the heavy tar by the chute. The low temperature section employs the waste heat boiler of the heat-tube type for improving the heat exchange effect. A design pressure in the waste heat boiler of the heat-tube type is 0.5 megapascal, and the low pressure vapor produced therein is supplied to the wet electrical dust precipitator for sweeping.

The biomass syngas has both relatively low dust content and tar content. The Venturi scrubber (in the absence of the filler) is configured for preliminary dust removal, not only are purposes of dust removal and temperature decrease are realized, but also harmful gases, including $H_2S$, $NH_3$, and HCN, are removed by washing.

The wet electrical dust precipitator is configured in the rear part of the process flow for ensuring control targets of the dust removal and the tar removal.

Compared with the prior art, the invention solves the following problems and has obvious advantages.

The method is applicable to the adiabatic high-temperature gasifier, and technical problems are solved that the gasifier in water cooling or product gas cooling has a complicate structure and a large size, slag easily aggregates on the wall of the gasifier, scale easily forms in the water side, the energy consumption and the power consumption are high. While the gasification stability is improved, production costs in the main gasification device are saved.

The high-temperature water-cooling flue is employed, so that problems are solved that the adiabatic flue is cumbersome, expanded, and is difficult for hanging, a liner thereof easily collapses, and a service life thereof is short.

Quenching process is performed out of the gasifier by spraying water, so that the gasification process is not affected. The quenching degree is partially controlled, thus, both the slag condensation effect and the thermal efficiency of the system are improved.

The configuration of the two sections of waste heat boilers under two pressures reaches a centralized collection of the heavy tar, gradual waste heat recovery, and improvement of the heat efficiency of the devices.

The Venturi scrubber in the absence of the filler is used to wash the gas and remove the dust, and the wet electrical dust precipitator is used to further remove the tar and the dust, thereby realizing the purification target by removing the dust and the tar gradually.

The invention has simple system, smooth process, low energy consumption, high efficiency, security and stability, and high economic benefit.

BRIEF DESCRIPTION OF THE DRAWINGS

The invention is described hereinbelow with reference to accompanying drawings, in which the sole FIGURE is a flow chart of a method for purifying biomass syngas under a positive pressure for producing oil according to one embodiment of the invention.

DETAILED DESCRIPTION OF THE EMBODIMENTS

A method for purifying biomass syngas under a positive pressure for producing oil is further illustrated hereinbelow combined with the drawing.

As shown in the FIGURE, an apparatus for conducting the main process of the technical solution comprises: a high-temperature water-cooling flue 1, a water-cooling quench tower 2, a waste heat boiler of a water-tube type 3, a waste heat boiler of a heat-tube type 4, a Venturi scrubber 5, a wet electrical dust precipitator 6, a wet gas tank 7, and a flare 8.

Parameters and process flow of the invention are as follows: an oxidation fan is employed to blast air to the high-temperature pyrolysis gasifier. High-temperature syngas produced in the high-temperature pyrolysis gasifier having a temperature of between 1000 and 1100° C., a dust content of lower than 20 $g/Nm^3$, and a tar content of lower than 3 $g/Nm^3$ is introduced out of the gasifier via a top thereof, through the high-temperature water-cooling flue 1, and into the water-cooling quench tower 2, where water is sprayed to decrease a temperature of the syngas to be 800±20° C. and to condense the slag. The syngas is then introduced to the waste heat boiler of the water-tube type 3 for recovering middle temperature waste heat. Middle pressure vapor produced therein is supplied to external devices. The syngas flowing out of the waste heat boiler of the water-tube type 3 has a temperature of 450±20° C. The syngas is then transported to the waste heat boiler of the heat-tube type 4 for recovering low temperature waste heat; and low pressure vapor produced therein is supplied to the external devices. The syngas is cooled in the waste heat boiler of the heat-tube type 4, and a heavy tar is separated simultaneously and is collected by a chute. The temperature of the syngas flowing out of the waste heat boiler of the heat-tube type 4 is decreased to 200° C. below. The syngas is then transported to the Venturi scrubber 5 (in the absence of the filler) to wash the syngas, remove the dust, and further decrease the temperature of the syngas, so that a majority of the dust, tar drops, and water soluble gas enter a washing liquid and are removed. The temperature of the syngas after washing is <45° C. The syngas is thereafter transported to the wet electrical dust precipitator 6 to further remove the dust and the tar. The syngas after the above cooling and purification treatments has both the dust content and the tar content of <10 mg/Nm$^3$, the temperature of <45° C., and a sensible heat recovery of higher than 80%, which completely satisfies the gas requirement of subsequent processes. The qualified syngas is then transported to the wet gas tank 7 for storage or is supplied to the downstream process for use. The flare 8 is in parallel connection with the wet gas tank 7 and is an important device to combust waste gas when the system is started and the composition of the syngas is excessive.

The main process flow of the cooling and washing of the syngas under positive pressures and related devices are described in the above. In addition to auxiliary systems like a water spraying system for the quench tower, a water feeding system for the two sections of waste heat boiler, a water circulating system for the Venturi scrubber, a water flushing system for the wet electrical dust precipitator, and a water sealing system for the wet gas tank, some standard or nonstandard devices are also provided. The standard or nonstandard devices form individual subsystems via pipes and valves, and serve related devices, so that the whole process flow of the cooling and washing of the biomass syngas is realized.

The invention claimed is:

1. A method for purifying biomass syngas, comprising:
   a) aerating a pyrolysis gasifier using an oxidation fan;
   b) introducing syngas produced in the pyrolysis gasifier through a water-cooling flue to a water-cooling quench tower, where water is sprayed into the syngas for quenching slag;
   c) introducing the syngas from the water-cooling quench tower to a waste heat boiler of a water-tube type to yield a first cooled syngas and a first vapor; introducing the first cooled syngas to a waste heat boiler of a heat-tube type to yield a second cooled syngas, a heavy tar, and a second vapor; and supplying the first vapor and the second vapor to external devices;
   d) washing the second cooled syngas in a Venturi scrubber in the absence of a filler to yield a first purified syngas;
   e) introducing the first purified syngas from the Venturi scrubber to a wet electrical dust precipitator to yield a second purified syngas having a dust content <10 mg/Nm$^3$, a tar content <10 mg/Nm$^3$, and a temperature <45° C.; and
   f) transporting the second purified syngas to a wet gas tank for storage or to a downstream process for use;
   wherein an outlet pressure of the oxidation fan is controlled to provide positive pressure to the water-cooling quench tower, the waste heat boiler of the water-tube type, the waste heat boiler of the heat-tube type, the Venturi scrubber, the wet electrical dust precipitator, and the wet gas tank.

2. The method of claim 1, wherein
   the syngas produced in the pyrolysis gasifier has a temperature of between 1000 and 1100° C., a dust content of lower than 20 g/Nm$^3$, and a tar content of lower than 3 g/Nm$^3$;
   the syngas is introduced out of the gasifier via a top of the gasifier, through the water-cooling flue, and into the water-cooling quench tower, where the syngas is cooled to be at 800±20° C.;
   the first cooled syngas has a temperature of 450±20° C.;
   the heavy tar is collected by a chute;
   the second cooled syngas has a temperature of 200±10° C.;
   the first purified syngas has a temperature of 45±2° C.; and
   a flare is in parallel connection with the wet gas tank for combusting waste gas.

3. The method of claim 2, wherein both the water-cooling flue and the water-cooling quench tower comprise membrane water-cooling pipes.

4. The method of claim 2, wherein a design pressure in the waste heat boiler of the water-tube type is equal to or larger than 1.6 megapascal.

5. The method of claim 2, wherein the temperature of the second cooled syngas is controlled at less than 200° C. to condense the heavy tar.

6. The method of claim 2, wherein a design pressure in the waste heat boiler of the heat-tube type is 0.5 megapascal; and the second vapor is supplied to the wet electrical dust precipitator.

7. The method of claim 1, wherein an inlet pressure of the wet gas tank is at between 4 and 6 KPa.

* * * * *